April 25, 1967 K. ZUSE 3,316,442
APPARATUS FOR CONTROLLING HEADLIGHTS BY COUNTERLIGHT
Original Filed Feb. 5, 1964 11 Sheets-Sheet 1

INVENTOR:
KONRAD ZUSE
By Silverman, Mullin & Cass
ATT'YS.

INVENTOR:
KONRAD ZUSE

Fig. 7

April 25, 1967  K. ZUSE  3,316,442
APPARATUS FOR CONTROLLING HEADLIGHTS BY COUNTERLIGHT
Original Filed Feb. 5, 1964  11 Sheets-Sheet 5

INVENTOR:
KONRAD ZUSE
By Silverman, Mullin & Cass
ATT'YS.

April 25, 1967   K. ZUSE   3,316,442
APPARATUS FOR CONTROLLING HEADLIGHTS BY COUNTERLIGHT
Original Filed Feb. 5, 1964   11 Sheets-Sheet 9

INVENTOR:
KONRAD ZUSE
By Silverman, Mullin & Cass
ATT'YS.

Fig.14

April 25, 1967 K. ZUSE 3,316,442
APPARATUS FOR CONTROLLING HEADLIGHTS BY COUNTERLIGHT
Original Filed Feb. 5, 1964 11 Sheets-Sheet 11

INVENTOR
KONRAD ZUSE
By Silverman, Mullin + Cox
Att'ys.

United States Patent Office 3,316,442
Patented Apr. 25, 1967

3,316,442
APPARATUS FOR CONTROLLING HEADLIGHTS
BY COUNTERLIGHT
Konrad Zuse, Hunfeld, Im Haselgrund,
Hesse, Germany
Continuation of application Ser. No. 342,760, Feb. 5, 1964. This application Dec. 13, 1965, Ser. No. 513,408
Claims priority, application Germany, Mar. 27, 1958, Z 6,580; Apr. 11, 1958, Z 6,603; Apr. 12, 1958, Z 6,604; Feb. 4, 1959, Z 7,098
17 Claims. (Cl. 315—83)

This is a continuation of my copending application Ser. No. 342,760, filed Feb. 5, 1964, for Apparatus for Controlling Headlights by Counterlight; which was a continuation-in-part of my then copending application Ser. No. 801,050, filed Mar. 23, 1956, for Head-Lights To Be Controlled by Counter-Light.

This invention relates to illumination apparatus for motor vehicles and more particularly to apparatus for automatically controlling illumination radiated from such a motor vehicle in response to counter light from another, approaching vehicle radiating similar illumination on a vehicle equipped with apparatus in accordance with the invention.

The presently conventional driver dimming (i.e. lowering) of automobile headlight beams in response to the driver's perceiving, or perhaps being dazzled by, the reciprocally directed headlight beams of an approaching vehicle has many disadvantages. First, the driver, to dim his own headlights, must perceive the headlights of an oncoming vehicle and, perhaps, be dazzled by these headlights. Thereafter, the driver's depressing head light beam blocks out the road from a short distance ahead over substantially the entire azimuthal range of the driver's vision.

To counter these often hazardous conditions of driving on a modern highway, proposals have been advanced for polarizing the light radiated from an automobile at an angle to the perpendicular and correspondingly polarizing automobile windshields at an angle similarly inclined to the perpendicular. Thus, light from a vehicle would be reflected back from the illuminated road ahead to pass easily through the windshield of the vehicle from which it originated. At the same time, this light would be polarized perpendicularly to the plane of polarization of the windshield of an approaching vehicle. This is an outstandingly well reasoned and effective solution to the problem of a motor vehicle operator's being partially blinded, on the one hand, by the dazzling "bright," undepressed beams of an approaching vehicle or, on the other, being somewhat blinded from the self imposed, restricted illumination achieved by depressed, "dim" headlight beams. This polarized light solution, admirably effective as it may be, depends for practical usefulness on universal acceptance and practice throughout the automobile industry.

Accordingly, there have been provided in the art numerous and varied arrangements for effecting a headlight control. Typically, upon the signal of a headlight from an ahead positioned, approaching vehicle, a suitable photosensitive element, such as the well known photocell, was energized to operate a conventional automobile "dim" switch.

For detecting this approaching vehicle headlight, there have been provided arrangements in which a reflecting mirror was continuously moved to scan an ahead positioned angular sector of interest and thus effect stimulation of the above noted representative "dim" switch as the mirror was positioned to direct light on a photosensitive element, such as the aforementioned photocell.

As a still further alternative, motor driven opaque screens have been provided in association with an automobile headlight. Such screens were driven by control of the exposure of a light sensitive element to light from an approaching vehicle, which caused the screens to rotate about a horizontal axis mounted in the so-equipped vehicle. Thus, the screen was driven in rotation in a vertical plane until the stimulated light sensitive element was shielded from the headlight of the approaching vehicle. Suitable follow up mechanisms were connected with the driven screen to adjust appropriate shutters for correspondingly interrupting an illuminating headlight beam in the prior art equipped vehicle so that no portion of this beam was directed at the approaching vehicle.

Thus, in the prior art it was known to detect lights from an approaching vehicle by a light sensitive element. Thereafter, in accordance with the prior art, it was known to angularly adjust a shielding member negatively to control the direction of an illuminating beam by interrupting, or shielding, this illuminating beam in correspondence with the angular position of the detetced beam. Advantageous and effective as was this scheme, however, some objection lay to the operational efficiency of such an arrangement. This objection was founded in the fact that only a negative sort of control was imposed on the illuminating light. That is, the illuminating light was radiated in all directions under ambient conditions and appropriate angular control was dependent upon the interposition of a passive screen device in the illuminating beam. Further, the proper angular interposition of this screen device in the illuminating beam necessitated relatively complex and delicate mechanical follow-up drive elements. Such elements, of course, were subject to misalignment and necessitated time consuming periodic adjustment.

Accordingly, it is a principal object of the present invention to provide a control arrangement for dimming headlights which is affirmative in the angular direction of an illuminating beam.

It is a further object of the present invention to provide an illumination beam angular control having a requisite sensing element for this control which is fixed in spatial relation with illuminating beam directing elements to eliminate the need for complex mechanical linkages from the light sensing element and thus freeing the beam directing arrangements from the need for delicate, troublesome, and repetitive adjustments.

These and other objects of the invention will be more clear from examination of the following brief description of illustrative embodiments of the invention and from a consideration of the appended claims.

The invention comprises generally a headlight system for mounting on a moving vehicle, advantageously, on an automobile. Means are provided for receiving light from an approaching headlight equipped automobile. This received light is directed by suitable means to be incident on a photo-responsive element for generating an electrical control signal in accordance with the direction from which this light was received. This control signal is thereafter directed by arrangements in accordance with the invention for affirmatively and selectively directing beams of light from the headlight system in accordance with the invention to avoid illuminating the approaching vehicle from which the light was received.

Figure 1:
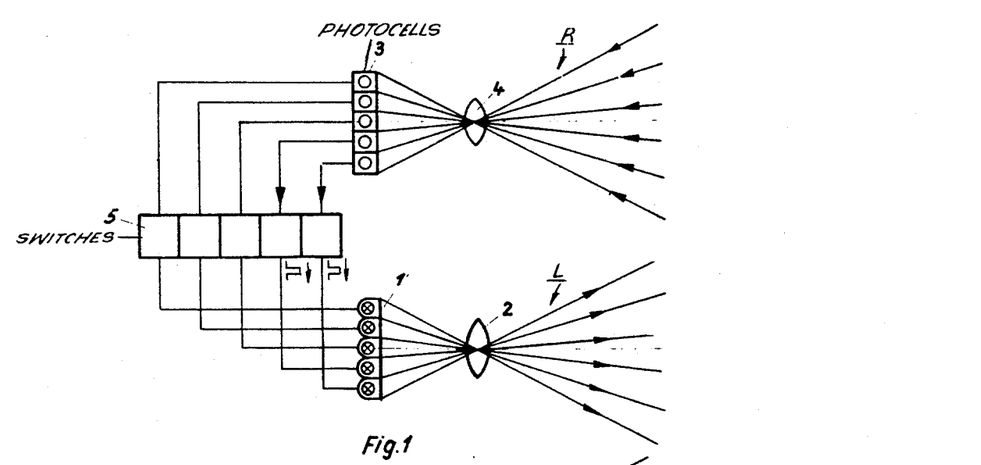
FIG. 1 is a diagram illustrating functional principles underlying operation of apparatus in accordance with the invention.

The invention, in one aspect, is illustrated generally by the plan view of FIG. 1. In this FIG. 1, a beam of received light R, is received from a source such as an approaching vehicle. This vehicle is not shown in FIG. 1 for simplicity. The component light rays of the beam R are directed by a well known focussing lens 4 to pass against an array 3 of plural photo-responsive elements, photocells. As shown in the drawing, rays of the illustrated received beam R arrive from several angularly displaced directions ahead of a vehicle provided with and transporting the system of FIG. 1 from left to right. The illustrated plural component rays of the beam R represent illumination of the array from all directions in a relatively broad sector ahead of the system of FIG. 1. In a more representative practical situation, only one or two of the plural rays of beam R will so illuminate the photocell array 3. Assume these to be the uppermost two rays of the several component rays included in beam R. Following established principles of optics, these two rays are directed by lens 4 against the lowermost two photocells of the array 3. Thus, electrical signals are generated by the photocells of array 2. These signals are selectively indicative of the direction of arrival of the uppermost two rays, in our illustrative situation, of the plural rays comprising beam R.

These signals so generated are conducted by ones of the indicated channels to an array 5 of controlled switch elements. The so controlled ones of the plural switch elements of the array 5 direct energizing signals along corresponding ones of the channels illustrated for selectively energizing ones of an array 1 of illuminating light sources, conventional headlamp bulbs and reflectors. For simple example, the uppermost three sources of the array are energized and the lowermost two are disabled. Thus, the component light rays radiated from the several sources of the array, represented by beam L, are passed through a lens 2, but this radiated beam L does not include component rays corresponding to the uppermost illustrated two rays of the received beam R. That is, the receiving lens 4 acts in conjunction with photocells of array 3 to scan an ahead angular sector to generate control signals for directing the composite illumination cast by the lamps of the array 1. This so cast illumination is thus angularly controlled without relative spacial movement between the received beam R sensing elements, lens 4 and photocells 3 and the illuminating beam L casting elements, array 1 and lens 2.

Figure 2:
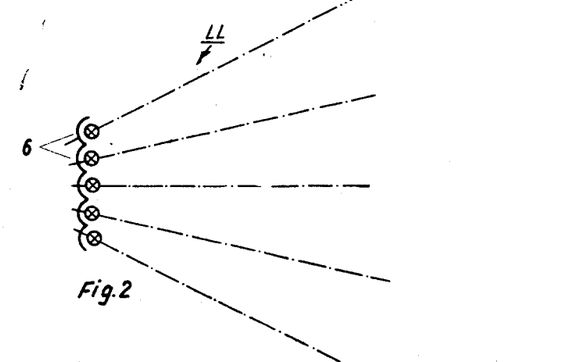
FIG. 2 is a diagram illustrating functional cooperation of apparatus in accordance with the invention.

In FIG. 2 there is shown diagrammatically a system element alternative to a corresponding element employed in the arrangement of FIG. 1 In the array 6 of plural light sources illustrated diagrammatically in FIG. 2, the individual light sources of the array 6 shown include both electrically powered incandescent lamps with respectively associated reflectors, which are configured and disposed in accordance with well known optical theory, for directing plural component rays of a composite beam of light LL along divergent paths as shown. Clearly, such an arrangement of the light source array 6 in this alternative structure in accordance with the invention includes, integrally with the light sources, reflectors configured for accomplishing optically the functions of the lens 2 in the structure of FIG. 1. Thus, clearly, the array 6 may be employed in the arrangement of FIG. 1 to eliminate need for lens 2. The reflectors of the array 6 simply may be oriented and disposed, in accordance with well known optical theory, to accomplish proper direction of illuminating beam LL.

Figure 3:
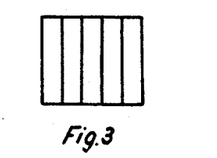
FIG. 3 is a diagram of angularly displaced zones of vision of assistance in explaining the operation of apparatus in accordance with the invention.

The diagram of FIG. 3 illustrates plural vertically disposed, contiguous rectangular blocks. These rectangular blocks represent, on the one hand, plural, discrete, azimuthally displaced sectors which are illuminated selectively by apparatus in accordance with the invention. On the other hand, these rectangular blocks represent angular sectors from which illumination may be directed toward a vehicle equipped with apparatus in accordance with the invention. Thus, for concretely establishing operation of apparatus in accordance with the invention, assume that the left hand rectangle of FIG. 3 represents an angular sector viewed from a vehicle, equipped in accordance with the invention, in which the headlights of an oncoming vehicle appear. Thus, in this situation, the left hand rectangular block of FIG. 3 may represent the position of the source from which, in FIG. 1, the uppermost ray of the plural composite ray beam R originates.

Clearly, in accordance with good driving practice, it is desired not to cast a beam in this sector and to illuminate the representative remaining four right hand sectors of the block diagrammed in FIG. 3. Apparatus in accordance with the invention accomplishes just this objective nicely, automatically and without need for relative movement between a light sensing element and an illuminating beam directing element. Referring to FIG. 1, a representative uppermost received ray of the plurality of composite rays, which comprise received beam R (from a source angularly positioned in correspondence to the left hand rectangular block of FIG. 3), is directed through focussing lens 4 to strike the lowermost photocell of the array 3 of such photocells. Thence, by way of channels as illustrated diagrammatically in FIG. 1, the electrical signal thus generated acts to disable the lowermost light source of the array 1 of such sources. Hence, the uppermost ray of the plural illuminating beams passing through lens 2, is blanked out and road segments to the right of this beam are illuminated by the remaining plural lamps of the array 1.

Figure 4:
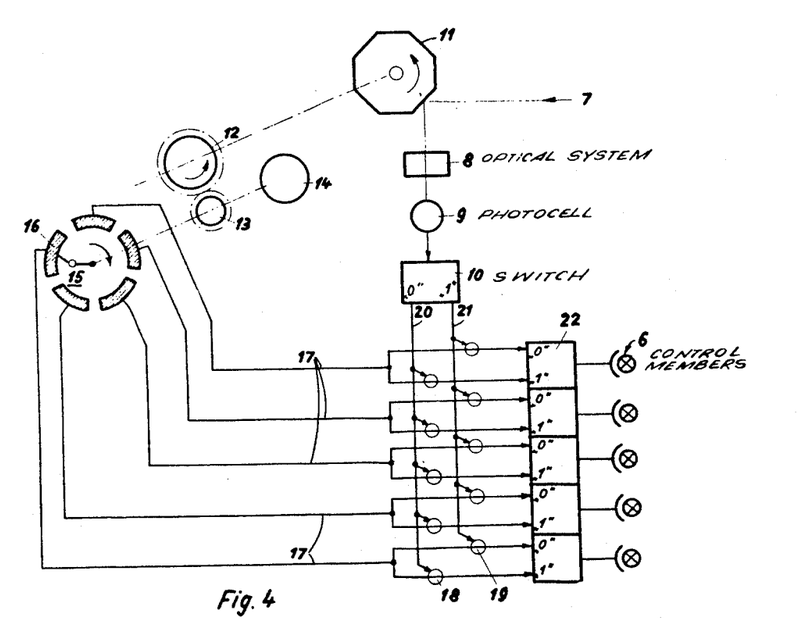
FIG. 4 is a diagram illustrating headlight control arrangements in accordance with the invention

Turning next to FIG. 4, there is seen in diagrammatic form an alternative illumination and illumination control system in accordance with the invention. Substantially, in FIGS. 1 and 2, a static arrangement was illustrated in which plural elements of the array 3 of light responsive elements were exposed simultaneously to receive the component rays of light beam R from a source, such as an approaching, head light equipped vehicle. In accordance with the embodiment of the invention diagrammatically shown in FIG. 4, a dynamic element, a continuously rotating light receiving, polygonal mirror 11, is employed successively to reflect light rays corresponding to any of the plural rays which compositely comprise received beam R in FIG. 1, for selectively controlling the direction of radiation of light beams from a plural array 6 of light sources. Such a one ray 7 is illustrated. As in FIGS. 1 and 3, this ray 7 corresponds to a beam from an approaching, headlight equipped vehicle, incident upon a vehicle provided with apparatus in accordance with the invention. That is to say, as shown in FIG. 4, the ray 7 passes from right to left until incident on a reflecting surface of a counter-clockwise rotating polygonal mirror 11.

This mirror 11 is driven in rotation by a motor 14 acting through meshed gears 13, 12 to drive, as indicated by dashed lines, both the polygonal mirror 11 and a distributor 15 associated with plural contacts 16. By means of these gears, the distributor is rotated about its axis once for each advance of a mirror surface, i.e., at a rate eight times that of the mirror 11. These plural contacts 16 are respectively connected through associated leads 17 and through alternative paths which include gates 18, 19, to an array of binary control members 22. The individual control members are respectively associated with an array of lamp-reflectors 6. The members energize the associated lamp when switched to an affirmative condition indicated by the several numerals "1." The opposite binary condition is indicated in the several elements 22 by the numeral "0." Now shifting of these control members 22 between the affirmative condition, in which an associated lamp of the plurality of lamps 6 is illuminated, and the negative condition, in which the lamp is darkened, is effected by signals on leads 20, 21. As shown, beam component light ray 7 is reflected successively from faces of the counter-clockwise rotating mirror 11 through an optical system 8, to energize a photocell 9. This photocell, when energized, generates an electrical signal to operate a binary switching element 10 between alternative conditions for selectively energizing leads 20, 21.

Thus, the plural gates 18, 19 are shifted to conditions for passing signals from associated lead 17 to the "0" or "1" input of the related control member 22. Recalling that the distributor arm 15 is rotated in correspondence with rotation of mirror 11, the operation of this arrangement in accordance with the invention becomes clear. In a normal, quiescent situation, the several gates 18, 19 are in conditions for illuminating an associated lamp-reflector pair 6 of the plurality of such pairs illustrated. That is to say, the control members 22 are in condition "1" and a lamp energizing signal is passed through gates 18.

Now, as the light receiving polygonal mirror 11 rotates, the several gates 18, 19 are successively switched by signals on lead 21. Thus, if a signal appears on an appropriately associated lead 17 while distributor 15 is connected therewith, the respectively associated lamp-reflector pair of the array, 6 is switched OFF, i.e. to a "0" condition. This condition endures until further rotation of mirror 11 serves to interchange the conditions of gates 18, 19 and distributor 15 applies an ON signal to the formerly OFF lamp-reflector pair by way of a gate 18 under control of lead 20.

Now the operation of this embodiment of the invention becomes clear. Upon the angular positioning of the ray 7 such that the photocell 9 is illuminated in correspondence with the contacting of a related one of the segments 16, the so selected one of the plural lamps-reflectors 6 is turned OFF, at least for a full revolution of the distributor 15. Thus, a light ray 7 incident on this rotary element 11 is correlated through the related illuminating control element, distributor 15, with the direction toward which a composite light beam from the array 6 of lamp-reflectors is directed.

Figure 5:
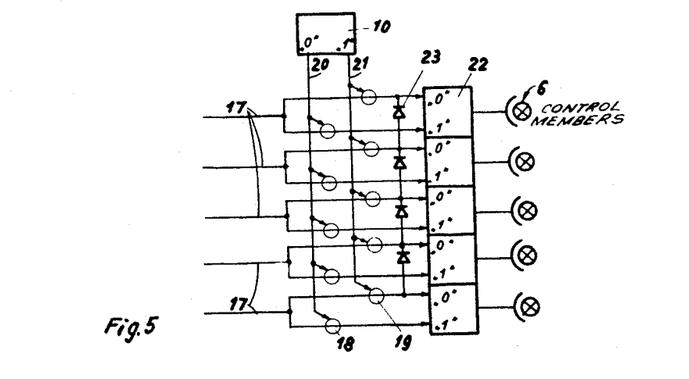
FIG. 5 is a diagram illustrating a portion of the arrangement of FIG. 4.

Referring now to the structure of FIG. 5, in this modification of the structure of FIG. 4, diodes 23 are positioned for interconnecting the several leads which, in turn, translate signals from the several leads 17 to the OFF terminals, "0," associated with the respective control members 22. The functioning of this arrangement becomes apparent. Once counter-rotating light receiving mirror 11 has operated to turn OFF one illuminating light source of the lamp-reflector array 6, say the next to bottom source of the plural source array shown in this FIG. 5, the remaining above positioned gates 19 are opened through the several diodes 23 and continued counter-clockwise rotation of distributor 15 turns OFF the above positioned illuminating sources of the array. This condition continues, at least, to the completion of rotation of distributor 15 in apparatus in accordance with the embodiment of the invention illustrated by FIGS. 4 and 5.

Figure 6:
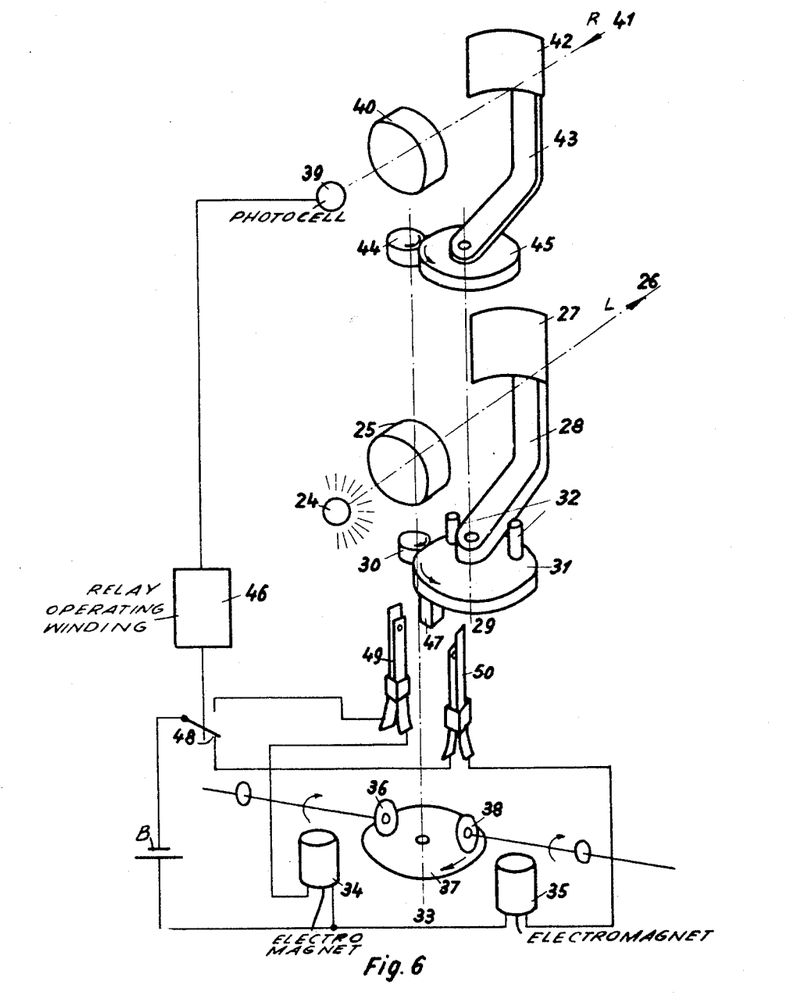
FIG. 6 is an isometric diagram illustrating an illumination control arangement in accordance with the invention.

Next, in FIG. 6 there is shown an embodiment in accordance with the invention in which a physical shielding member is provided for directing the illuminating light beam from a source, lamp 24.

In this arrangement for mounting in a forward orientation on a vehicle a light sensing element, photocell 39 is arranged in optically parallel, spacially fixed relation with a light source 24, each of the parallel elements being aligned with a companion focussing optical system 40, 25, respectively. The illuminating light beam from the source 24 is directed, as shown, along an axis 26 from left to right and the activating light beam for the approaching vehicle is directed illustratively along axis 41. Note here that, as shown, the light shields 27, 42 are interposed adjacent the axes 26, 41, a representative null situation.

The shields 42, 27 are respectively mounted on vertically aligned tables 45, 31, respectively, in fixed spacial relation for rotation about a common vertical axis 29. This mounting is by crank arms 43, 28 as shown. Positive stops 32 are mounted in table 31 on either side of crank 28 to provide stopping for this crank 28 and the associated illuminating beam directing light shield 27.

The two circular tables 31, 45 are driven respectively by engaging drive wheels 30, 44 mounted on a common drive axis 33 for rotation thereabout under urging of a concentric driven wheel 37. This driven wheel is urged to rotation by orthogonally mounted, peripherally positioned, selectively contacting, and coaxial friction drive wheels 36, 38. As appears in FIG. 6, these drive wheels are mounted on common, horizontal, like rotating shafts which are driven continuously by a well known source not shown.

A contact 47 depends from table 31 in vertical relation for opening the illustrated electrical contact members 49, 50 as table 31 rotates right or left. This rotation, it will be recalled, is in fixed correspondence with urging of engaged drive wheel 30 and with rotation of circular mounting table 45.

The continuously like-rotating drive wheels 38, 36 effect alternatively opposite rotation of driven wheel 37 by means of the electromagnets 34, 35 which are alternatively energized from battery B by leads shown, through relay switch 48 and normally closed break contacts 49, 50. As depending member 47 acts to open one or the other of these break contacts 49, 50, energizing of the related magnet ceases. In the situation illustrated, neither contact 50 nor 49 is so engaged. For simplest understanding of the invention, let it be assumed shields 27, 42 are driven to the left but not enough for uncovering the light axes 41, 26. Thus, operating winding 46 for relay switch 48 is not energized and this switch is maintained in the position illustrated. Contacts 50 are closed to energize magnet 35. Drive wheel 38 engages driven wheel 37 to cause rotation of wheels 37, 30, 31, 44, and 45 as indicated by arrows. Note, that this is an illustrative situation for ease in understanding the embodiment of the invention shown in FIG. 6.

Now, as the relatively fixed, light directing shields are driven fully left, assume the photocell 39 is illuminated along axis 41 by light from an approaching vehicle.

Operating winding 46 is energized and switch 48 shifts to a position alternative to that shown. Magnet 35 is de-energized by opening of switch 48. Magnet 34 is energized and drive wheel 36 bears on driven wheel 37 to reverse the direction of rotation illustrated for that wheel. Consequently, depending member 47 is now driven toward break contacts 49 and shields 42, 27 are interposed in light paths 41, 26, respectively.

Now it should here be noted that from the arrangements discussed, mechanisms are provided for causing an oscillatory motion of controlling screen 42 as the switch 48 shifts positions. This does not entirely follow with respect to illuminating axis 26 for illuminating light directing shield 27. This latter shield is slidably mounted on common axes 29 for the two tables 45, 37. Thus, in an operating condition the illuminating light directing mounting arm 28 for shield 27 may be adjusted on this axis between limits imposed by stops 32. Nonetheless, the sensing element comprising shield 42 is fixedly related with the illuminating light directing shield 27 during operation of the arrangement of FIG. 6.

Figure 7:
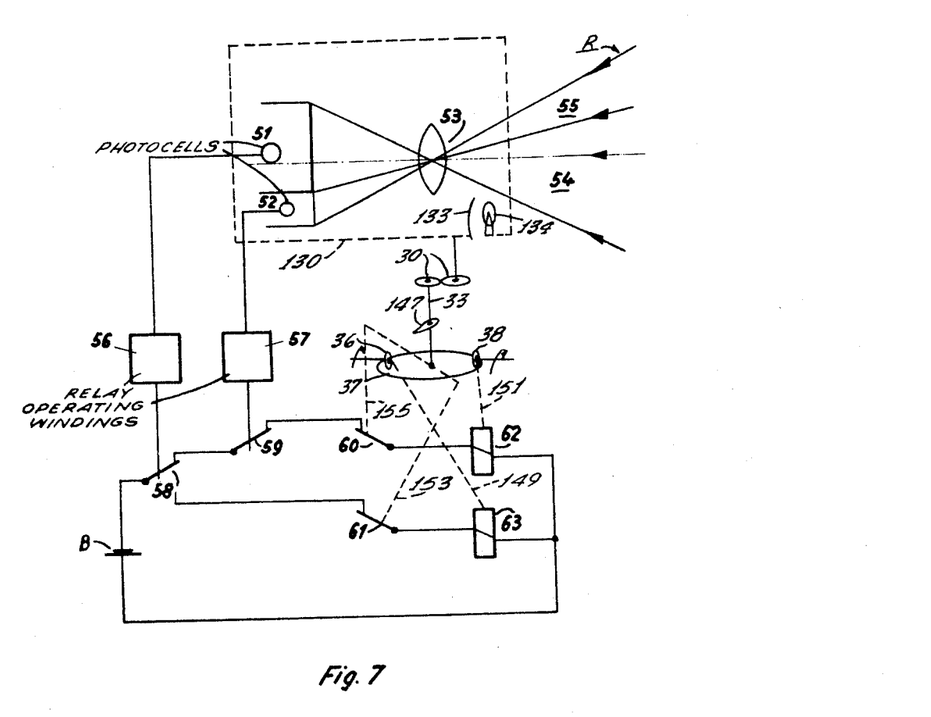
FIG. 7 is a diagram illustrating still further aspects of apparatus in accordance with the invention.

Turning next to FIG. 7, there is shown a structure related to that of FIG. 6, but employing a reflector instead of the shield of that former FIG. 6. In FIG. 7, as in FIG. 6, first and second drive discs 36, 38 are shown mounted on like shafts, driven in like rotation as shown for selective frictional engagement with driven disc 37.

This driven disc 37 is associated in driving relation with a shaft 33, see FIG. 6, for rotating a carrier frame 130 by friction drive wheels 30.

Electromagnets 62 and 63, as indicated by dashed lines 151, 149, are associated (again see FIG. 6), in operating relation with drive wheels 36, 38 for driven disc 37. Suitable well known mechanisms, indicated by dashed lines 153, 155, are respectively operated by a cam 147 mounted on shaft 33 for providing limit stops on rotation of the shaft and consequently on carrier frame 130. When actuated by cam 147, these mechanisms respectively operate to open normally closed switches 61, 60 as in FIG. 6 with respect to the member 47 and the switches 49 and 50; but with somewhat different results as next described.

Relay windings 56, 57 are respectively connected in energized relation with photocells 51, 52 for operating relay switches 58, 59 which are, in turn, connected as shown in series circuit with an energizing battery for both electromagnets 62, 63.

The photocells 51, 52 are positioned for detecting light originating ahead of a vehicle transporting apparatus in accordance with the invention, in angularly displaced sectors 54, 55. It is well here to observe that in this diagram of FIG. 7, the two angular sectors 54, 55 lie in a plane corresponding generally to that of the earth's surface on which the illuminating apparatus of the invention moves, but for illustration purposes only, are shown displaced 90° so as to appear to project azimuthally rather than horizontally.

This system of FIG. 7 corresponds substantially to that of FIG. 6 in operation. Thus, in a normal situation where no light is received by lens 53 from either one of adjacent angular sectors 54, 55, illuminating system 133, 134 casts a beam in a direction as dictated by the position of carrier 130. Both switches 58 and 59 retain normal closed positions as unenergized photocells 51, 52 fail to supply current to relay windings 56, 57. Electromagnet 62 operates driving wheel 38 into engagement with driven disc 37 and, by action of drive wheels 30, rotates the platform 130 fully to the left, as viewed in diagrammatic FIG. 7.

The resultant extreme position of the mounting platform 130 causes in actuation of linkage 155 to open switch 60 and de-energize relay 62. Thus, the platform 130 bearing both illuminating lamp 134 and the fixedly relating sensing arrangement 51, 52, 53 is in a stable, extreme position.

Upon entry of light into left hand sector 55, the photocell 52 applies an energizing signal to the relay 57, which thereupon opens switch 59 and deenergizes relay 62. Since switch 58 is still in the normally closed position, current is no longer being applied to either relay 62 or 63 and the drive of platform 130 becomes immobile. Upon entry of a light into the sector 54 the winding 56 is energized to shift the position of switch 58 and to energize winding 63. Consequently, wheel 37 is driven in a direction opposite to that shown and the carrier platform 130 is rotated clockwise to direct light from the illuminating source 134 to the right.

As a consequence, the lamp bearing platform 130 either is immobile or is driven clockwise by illumination into angular sectors 55 or 54 respectively. When this illumination no longer exists, switches 58, 59 return to the normal, de-energized condition illustrated and the platform 130 once more moves counter-clockwise as seen in FIG. 7.

Now a brief examination of operation of the two illumination control systems of FIGS. 6 and 7 is in order. In the former structure, light from a source is passed beyond an angularly positioned, opaque shield 42 which is mounted in linked, axial relation with a companion, opaque shield 27, beyond which illuminating light emanates from a vehicle equipped with apparatus in accordance with the invention. Thus, the illuminating beam is controlled by the fixedly related positioning of the controlling light sensitive elements. In the structure of FIG. 7, similar driving arrangements are employed, but here the illuminating beam directing shield is replaced by a driven platform in which light source and receiving elements bear fixedly related control on illuminating elements for both receiving and radiating light in controlled directions. Thus, by employment of the control arrangement of the embodiment of FIG. 7, the angular positioning of a single platform, which positioning is controlled by a received beam, controls simultaneously angular positioning of a radiated beam affirmatively.

Figure 8A:
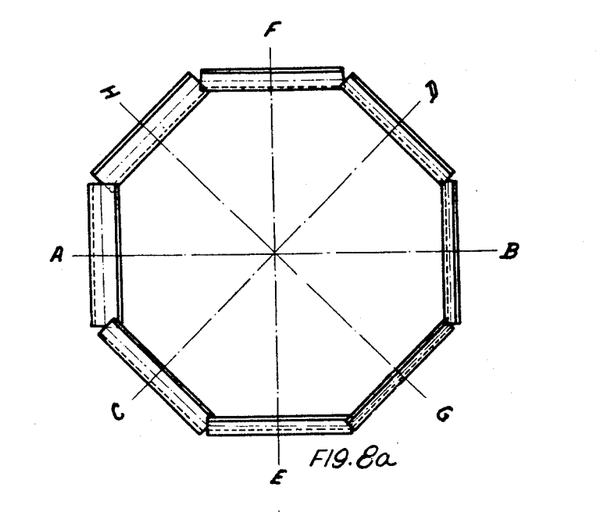
FIGS. 8a and 8b, respectively are a plan and an elevation view of a reflector element for advantageous employment in apparatus in accordance with the invention.
Figure 8B:
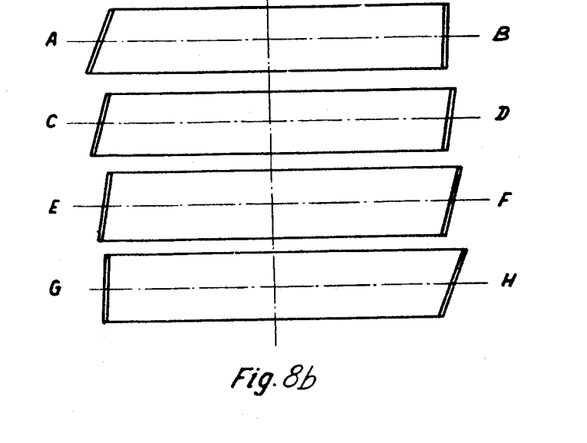

Looking next to FIGS. 8a and 8b, there is shown in plan and elevation views respectively, mirror pairs A–B, C–D, E–F, and G–H, corresponding to the eight oppositely paired mirror sides of an octagonal mirror, which may be employed advantageously in the structural environment of the mirror 11 of FIG. 4, for directing received light beams in illumination controlling relation within the structure of the invention.

As appears in the several sectioned views, the consecutively positioned mirrors A–C–E–G–B–D–F–H are successively inclined cyclically with respect to the axis of rotation of the polygonal mirror, as seen in plan view in FIG. 8a.

Let us examine, in FIG. 4, the optical behavior of a ray 7 of light from an appropriate source as this ray is incident on the received light controlling octagonal mirror 11 which is constructed in the configuration illustrated in FIGS. 8a and 8b. Consider the situation in which individual mirror A of FIG. 8a is positioned, as seen in FIG. 4, for receiving a light ray 7 azimuthally above the plane of that FIG. 4 from a source, such as an approaching vehicle. Clearly, the mirror A reflects the incoming beam of light 7 downwardly so as to be parallel with the plane of FIG. 4, which is the same as the plane of FIG. 8a. At the same time, the counter clockwise rotation of this mirror in a scanning orientation sweeps the received ray 7 from right to left in accordance with established optical principles of reflection.

Thus, in acordance with the invention, employment of the mirrors of FIGS. 8a and 8b, in the structural environment of the mirror 11 of FIG. 4, enables accomplishment of a vertical and horizontal sweep of an ahead positioned sector. This sweep clearly enables directly observed illumination rays in controlling relation to illuminating beam casting arrangements of the type such as the array 6 of FIG. 4. Such an array, suitably adjusted, as will be clear to one skilled in the art, to effect not only horizontal but vertical control of the illuminating beam resultant of three dimensionally modified array of illumination sources such as the array 6.

Figure 9:
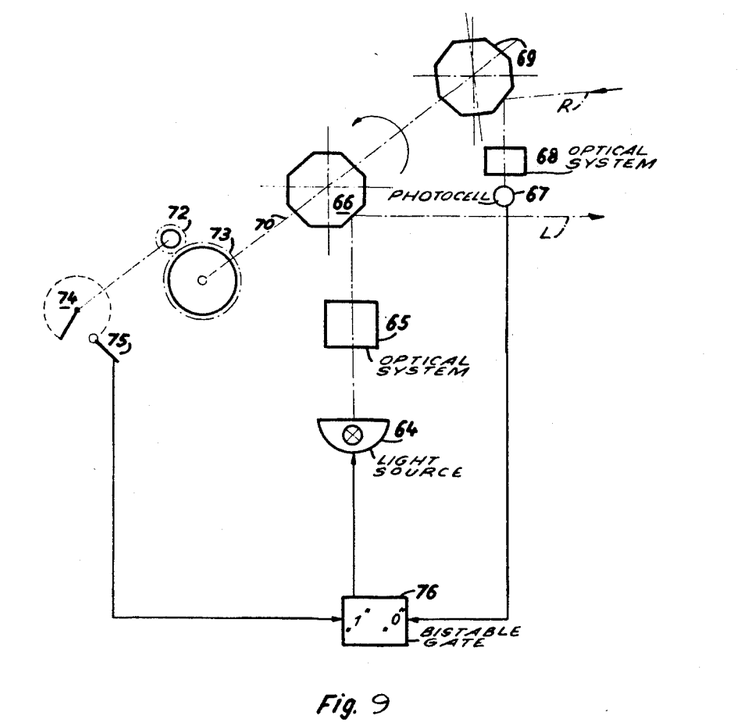
FIG. 9 is a functional diagram illustrating the cooperative interaction of apparatus in accordance with the invention.

Turning next to FIG. 9, there is seen a plan view diagram of yet another optical system for employment by arrangements in accordance with the invention. Reference to FIG. 4 shows considerable similarity between portions of these two embodiments. For more closely correlating the similarity, it may be said that in the instant FIG. 9, rotary switch 74 bears a similarity to the switch 15 of the former FIG. 4. In the embodiment of FIG. 9, a second rotatable polygonal mirror 66 is provided. These two polygonal mirrors 66, 69 are mounted for like rotation on a common axis 70. The receiving mirror 69 is angularly displaced from the transmitting mirror 66 by a small amount in the direction of rotation of the two mirrors to prevent light from beam L from reflecting back from an ahead object and acting as a stimulus to the photocell 67 as if such light were a beam R.

A drive arrangement 72, 73 is coupled to the common mirror drive shaft 70 for operating rotary switch 74 to close contact 75 to supply a pulse signal input to bistable circuit gate 76 in correspondence with each revolution of mirrors 66, 69. A corresponding input signal is applied to a complementary terminal of this gate 76, as shown, from photocell 67 for directly controlling light source 64 and, thus, the outgoing illuminating light ray L. The gear ratio between elements 72, 73 causes the switch 74 to rotate eight times faster than the mirrors 66, 69.

As indicated by the numerals "1" and "0," the bistable circuit 76, constructed in accordance with well known principles, is switched to a disabling condition for light source 64 upon energizing of photocell 67 by an incoming ray R. This disabling is accomplished prior to angular positioning of outgoing illumination L in the direction from which light ray R is received. Thereafter, completion of rotation of switch 74 applies a reenabling signal to bistable gate 76. Accordingly, light source 64 is extinguished from an angular position of transmitting mirror 66 just prior to the angular position of the incoming ray R.

The resulting function of this system arrangement follows quite naturally. Normally, the bistable circuit 76 is in an enabling condition for light source 64. Thus, as an enabling signal is applied to bistable gate 76 from switch 74 on each revolution of switch 74, the light source 64 gives a continuous outgoing illuminating ray L. The enabling signal from switch 74 has no effect on the already enabled gate 76. As a disabling ray R is received, a signal is applied to gate 76 just prior to the directing of ray L toward that received ray R. Thereafter, during concurrent revolution of mirrors 66, 69 the light source 64 remains dimmed until, let us say, at a start rotary mirror position, the enabling signal from switch 74 causes illumination of source 64. The incoming ray persisting, this source 64 is again dimmed on reception of a ray R from that source. Thus, so long as an incoming ray R from an approaching vehicle persists, the outgoing illuminating beam L is extinguished in that angular position and to the left thereof. Clearly, in accordance with the invention, those skilled in the art will understand that clockwise rotation of mirrors 66, 69 enables dimming illumination in a sector to the left of an oncoming vehicle and throughout a sector to the right of that vehicle. Sensibly, such modification of apparatus in accordance with the invention is advantageously employed in countries having a left hand flow of traffic, opposite to that customarily practiced in the United States.

The operation of this embodiment of the invention will be enhanced by a separate consideration of the function of the two rotating polygonal mirrors 66 and 69. Consider first the situation in which no light appears from ahead of the vehicle equipped with apparatus in accordance with the invention. The beam R indicated in FIG. 9 is non-existent and, accordingly, the rotating mirror 69 reflects no light to illuminate photocell 67. Hence, no electrical signal is applied to operate gate 76 to a position for turning off light source 64. Thus, the light from this source passes through optical system 65 and is reflected outwardly along path L as a normally directed auotmobile headlight beam. The indicated counter clockwise rotation of mirror 66 sweeps this beam L from right to left until a next succeeding surface of the polygonal mirror comes into engagement with direct light from optical system 65. Once again the beam L is moved from an extreme right position to the left to sweep over an arc corresponding to movement of the light beam engaging surface of rotating transmitting polygonal mirror 66. Without more, this action continues so long as gate 76 is not actuated to turn off light source 64.

Now the rotating receiving mirror 69 comes into play. Recall the latter receiving mirror 69 is somewhat angularly displaced from transmitting mirror 66. This displacement is such that light R incident on the mirror 69 must arrive from an angle slightly to the left of the light L radiated from rotating transmitting mirror 66 in order for this incoming light to energize photocell 67. Hence, just before the light beam L moves left to the line of received beam R, a signal from beam R and the receiving mirror 69, energizes photocell 67. The so generated electrical signal from the photocell thus operates gate 76 to turn off source 64 so that no illuminating beam L is radiated outward and parallel to beam R.

If in accordance with this invention, the mirror 66 were in the form of the mirrors shown in FIGS. 8a and 8b, then a combined horizontal and vertical sweep of illumination by the beam L could be accomplished.

It will be readily clear to those skilled in the art, and the invention so comprehends, that simple reflections may be prevented from thwarting control of illumination by apparatus in accordance with the invention by the employment of well known correlation circuit arrangements in support of those described. Thus, it will occur to those skilled in the art, that appropriate well known delay arrangements may be provided to preclude dimming of a light by its own reflection.

Similarly, in accordance with the invention it is comprehended, that the well known "bright" or raised light beams of a vehicle may be controlled by apparatus in accordance with the invention while, the "dim" or depressed beams may be independently energized.

Clearly, too in accordance with the invention there is comprehended the employment of compounding arrangements of circuits embodying the screening and the light directing arrangements in accordance with the invention.

Figure 10:
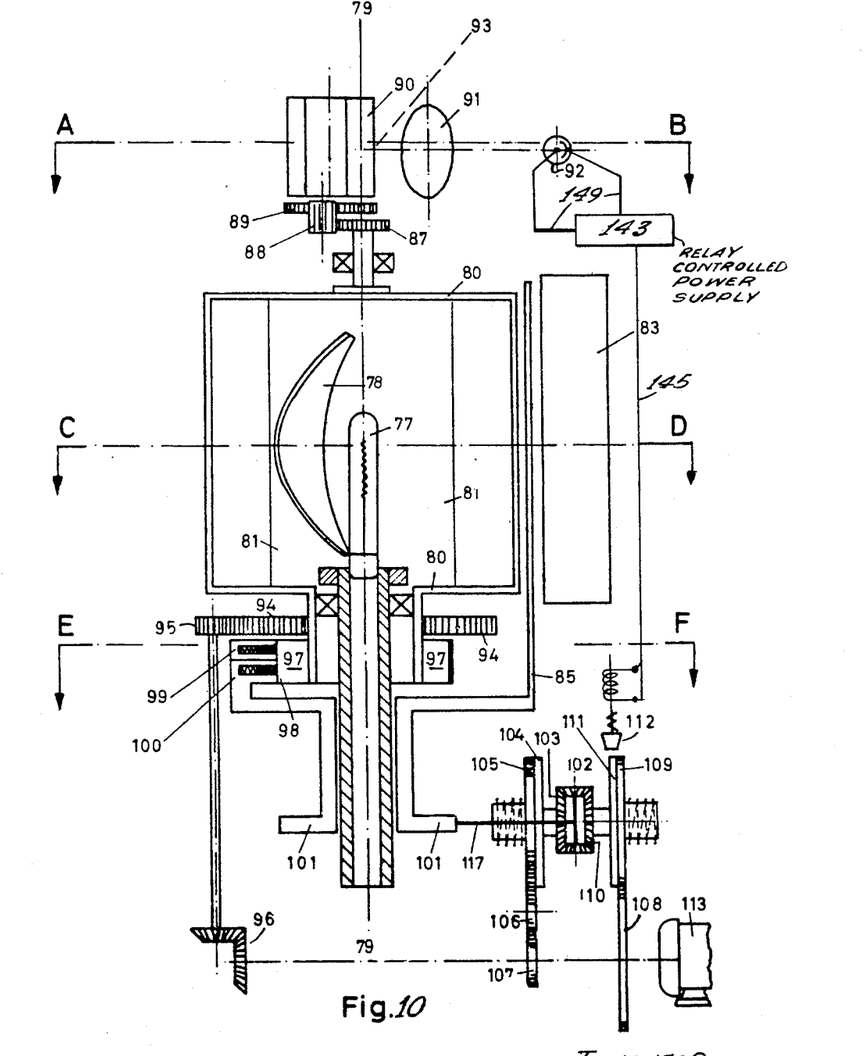
FIG. 10 is a sectioned elevation view of apparatus in accordance with the invention.

Turning next to FIG. 10, there is shown in sectioned elevation view structural details of a headlight for a controlled employment in arrangements in accordance with the invention, which arrangements compound the operational principles illustrated in the preceding figures. The controlled head lamp of FIG. 10 is sectioned as indicated by section lines A–B, C–D and E–F for illustrating portions thereof more clearly in plan views of FIGS. 12, 11 and 13, respectively.

With advantage, the illumination source 77 comprises a radiant filament mounted coincident with the axis 79 of revolution of the controlled head lamp of FIG. 10. This head lamp comprises a reflector 78 having a vertically parabolic cross section (e.g., parabolic in the plane of FIG. 10) with the parabolic focus coincident with the radiant filament. At the same time, as appears in the section plan view C–D of FIG. 11, this reflector has a horizontally circular cross section centered on the vertical filament of source 77. Thus, rays from the filament are reflected parallel to the section line C–D of FIG. 10 and radially of the circular cross section of reflector 78.

These rays, illuminating rays, are directed outwardly, to the right, through a ray bundling lens 83. The source 77, the reflector 78, and the lens 83 are immobile. An opaque screen 85 is mounted concentric with the axis 79 and is selectively pivotal thereabout through its support means 101, which has gear teeth meshed with a worm gear on axle 117. (The latter is shown only diagrammatically.)

Figure 11:
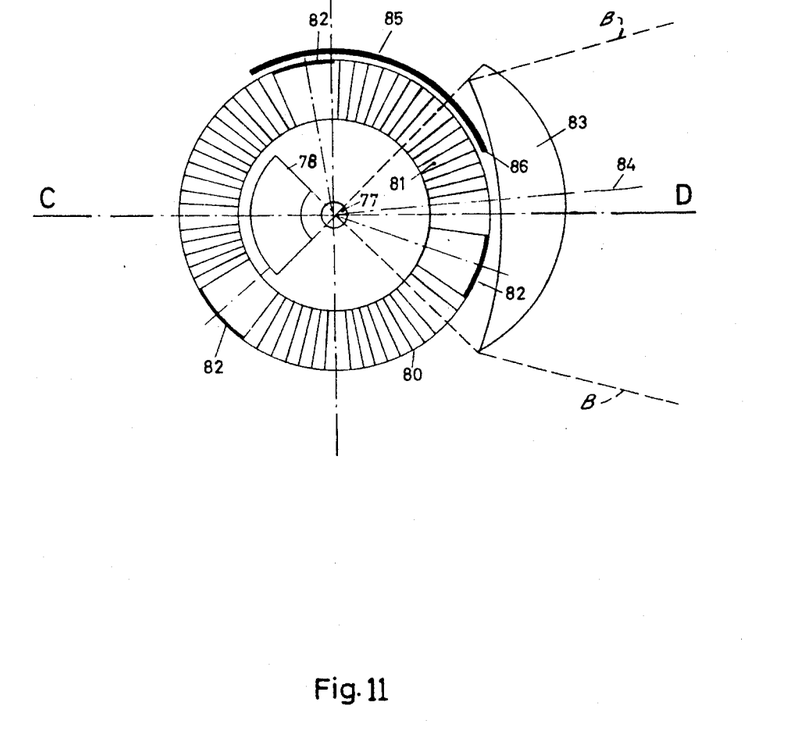
FIGS. 11, 12, 13, are partial plan views of apparatus as illustrated in FIG. 10, along section lines shown in that former FIG. 10. The successive plan views of FIGS. 12, 11, 13, respectively correspond to the section lines, from top to bottom in FIG. 10 designated A–B, C–D, E–F.

A cylindrical frame 80 coaxially surrounds the light source and reflector 77, 78 and is continuously rotated thereabout by gears 94, 95, and 96 which are coupled to constantly rotating, unidirectional motor 113. As best seen in FIG. 11, the frame 80 carries a plurality of radially positioned, opaque lamellae or plates 81. The constant rotation of the frame 80 and its lamellae increases the definition of the projected light from the source 77.

The same motor 113 acts through gears 108, 109 and friction clutch plate 111 to drive well known differential gear 102, having drive wheels 103, 110, as shown. These drive wheels are respectively linked in driving relation with friction clutch plates 104, 111, respectively, as shown. The former clutch plate is associated in driving relation with gear 105 and, therethrough, the axle 117 and the support means 101 for pivotally moving the screen 85. Gear 105 is also, as indicated, mounted in engaged relation with gears 106, 107 of the indicated gear train. Also as shown, driving gear 108 is approximately twice the size as directly linked, coaxial gear 107; whereas, oppositely driven gears 109 and 105 are of the same size, as are their associated oppositely driven differential gears 110 and 103. Accordingly, under normal drive conditions, the motor 113 imparts, through the gear-differential train, twice as much drive to the gear 110 than to the gear 103; hence, the axle 117 is rotated in a first direction to impart counter-clockwise motion to the screen 85. If this motion is not interrupted as subsequently described, it will be arrested by stop means, not shown, once the screen attains an extreme left position which fully exposes the lens 83 to the illumination from the source 82.

Upon the instigation of an appropriate control signal, a magnetically operated brake blade 112 engages the clutch plate 111, stops its rotation, and thereby decouples the right side of the differential train from the motor 113. As a result, only the gear 103 is in driving coaction with the axle 117. Since gear 103 constantly is urged in a direction reverse of gear 110, the axle 117 now is rotated in a second direction to impart clockwise motion to the screen 85.

The control signal for actuating brake blade 112 is generated by photocell 92 only when it is energized by light ray 93 reflected by polygonal mirror 90 through lens 91. Leads 149 and 145 conduct the signal from the photocell 92 to the blade 112 via a relay controlled power supply 143.

Thus far described, the apparatus of FIG. 10 drives the screen 85 to the left in the absence of oncoming light energizing the photocell 92 and drives the screen to the right while light is being received. Obviously, a third control condition is required, one which stabilizes the axial pivoting of the screen when it is properly angularly positioned with respect to an ahead located light issuing source. This third condition is produced by the elements shown in FIGS. 12 and 13, with reference to FIG. 10.

Figure 12:
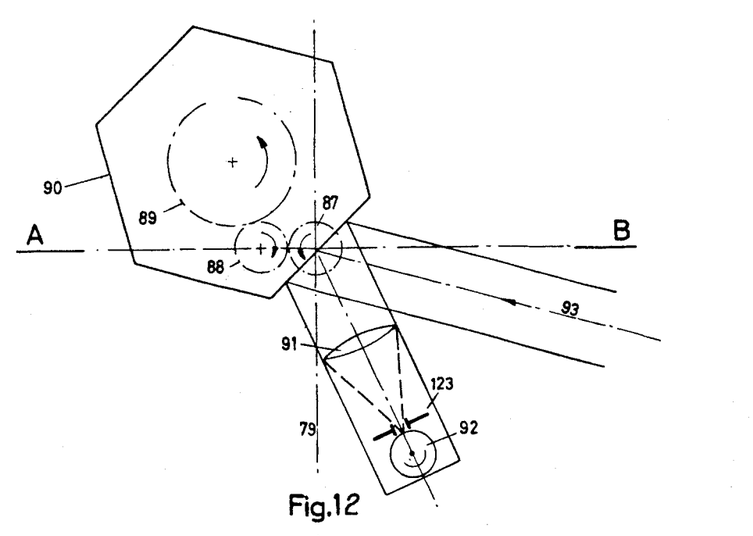
Figure 13:
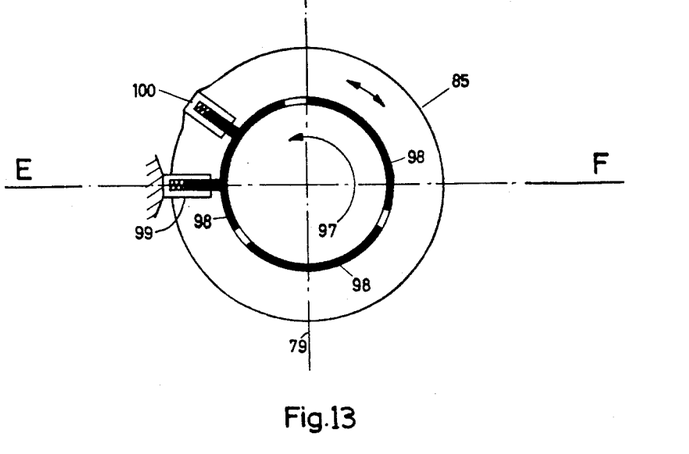

As shown, a slip ring 97 is mounted to the bottom of platform 80 and continuously rotates in synchronism therewith. A brush 99 is immovably positioned in electric surface contact with the slip ring 97. A second brush 100 is secured to the screen 85 and moves therewith relative to the immovable brush 99 and independent of the continuous rotation of the slip ring. Though not shown, the brushes are electrically coupled to the circuitry between the photocell 92 and the blade 112 in a circuit completing manner.

Secured to the top of the platform 80 is a gear 87 which is coupled through gears 88 and 89 to a hexagonal mirror 90. Interposed between the mirror and the photocell 92 is lens 91 and an apertured masking plate 123 which focus and narrow a beam of light 93 incident on and reflected from the mirror 90.

For reasons soon to become obvious, the gear train 87–89 drives the six-sided mirror 90 at a rate one-half of that of the platform 80 and slip ring 97 and the slip ring is divided into three sectors 98 insulated from one another. Accordingly, continuous drive by motor 113 causes one full sector 98 to pass by the fixed brush 99 in the same time that one side of the polygonal mirror rotates past lens 91.

Assuming that an ahead positioned light source generates a light beam 93, the optic and photoelectric apparatus of this invention will, as already described, scan the forward area, receive the light beam 93, transduce it, and selectively drive the screen 85 clockwise to interpose it between the illumination source 77 and the source of beam 93. Such movement of the screen 85 also causes the brush 100, secured thereto, to translate to a position further from the immobile brush 99. Hence, these brushes are common to the same segment 98 of rotating slip ring 97 for a shorter time. Since the brushes are in the enabling circuit of the blade 112, once they are connected to different segments 98, the blade 112 is decoupled and the screen stops pivoting to the right, even if the photocell 92 is energized. Accordingly, as the screen pivots farther to the right, each scan of the beam 93 by a side of mirror 90 produces increasingly less clockwise drive time and increasingly more counter-clockwise drive time for the differential gear drive. In the above manner, the screen 85 will not be over driven to the right and will attain a relatively stable position facing the origin of beam 93 until the beam ceases to be incident on the phototransducer 92. At such time, the screen will again be driven back to its left extreme, home position, as previously described.

With reference again to FIG. 11, three light beam blanking elements 82 are mounted, as shown, uniformly displaced about the radiating filament 77 on the rotating platform frame member 80. These plural opaque members are interposed in the beam radiating from filament 77. These so interposed members are angularly positioned to preclude light from filament 77 from impinging upon a forward positioned object and reflecting back upon elements 90–92 and thereby adversely affecting the selective operation of blade 112.

Figure 14:
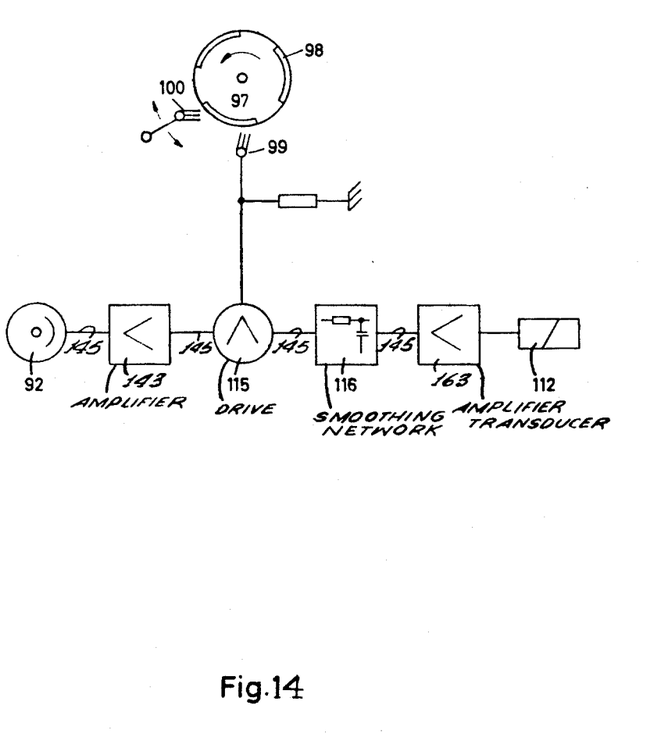
FIG. 14 is a switching diagram of apparatus in accordance with the invention.

Turning next to FIG. 14, the functional control relations of an illustrative apparatus in accordance with FIGS. 10–13 are shown in symbolic functional, diagram. Here, the rotationally adjustable brush 100 is shown in engagement with one end of an indicated sector 98 of slip ring 97 and the fixed brush 99 is in contact with the other end of the same segment, so that if photocell 92 is energized, the circuit to blade 112 would be complete.

The electrical signal developed by the incidence of an oncoming light beam on photocell 92 is applied to an amplifying arrangement 143 for application to a suitable energy directing arrangement 115 representative of the drive arrangements from motor 113 shown in FIG. 10.

Recalling that this FIG. 14 is diagrammatic, the energy from photocell 92 is transferred through the arrangement 115 to a well known wave smoothing capacitor network 116, included in channel 145, through a suitable amplifier-transducer 163, which includes the magnetic coil shown in FIG. 10 in association with stop blade 112, for actuating this stop blade into engagement with plate 111.

Thus, there is diagrammed functionally in FIG. 14, the electro-mechanical channels by which incidence of light on photocell 92 energizes braking blade 112 to permit driving of the shield 85 in interdependent fixed relation with the incidence of light on the optical sensing elements in accordance with the invention.

Figure 15A:
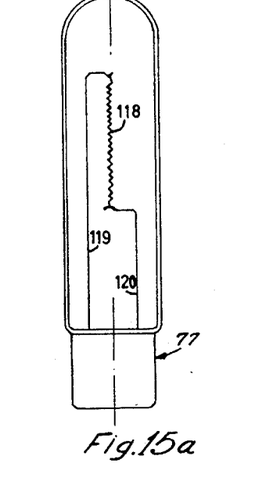
FIGS. 15b and 15a, respectively, are a plan and an elevation view of an electric bulb peculiarly adapted for advantageous employment in apparatus in accordance with the invention.
Figure 15B:
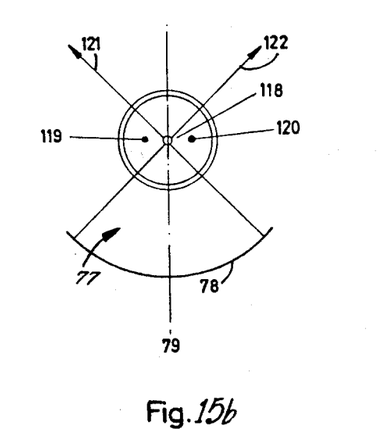

Turning next to FIGS. 15a and 15b here, respectively, in sectioned plan and elevation views is shown an incandescent light bulb 77 for advantageous employment in apparatus in accordance with the invention in the orientation illustrated in FIGS. 10 and 11.

This bulb 77 includes a vertical radiating filament 118 having associated supports and input leads 119, 120 for physical orientation as illustrated in those priorly noted drawing figures.

In the plan view of FIG. 15a, the particularly advantageous geometric features of the bulb 77 appear. Recalling that the reflector 78 is circularly-parabolically configured, rays 121, 122 reflected from this filament pass radially of the circular reflector section through this filament in planes parallel to the plane of the lower, plan section portion of FIG. 15b. Thus, the input leads 119, 120 are spaced laterally apart from this radiating filament and no interference is presented by these lead-supports 120, 119 to the radially reflected rays from the circularly configured horizontal section of reflector 78.

It will readily occur to those skilled in the art that many variations on the illustrative embodiments of the invention may be made without departing from the spirit thereof.

What it is sought to be secured by Letters Patent of the United States is:

1. Apparatus for directing an illuminating beam in an ahead direction from a movable vehicle which comprises a first, polygonal mirror for scanning an ahead positioned angular sector for selectively directing light received from said sector in response to the direction of receipt, mounting means for said mirror for enabling rotation thereof about an axis positioned vertically with respect to said ahead direction, a photocell positioned in receiving relation with light reflected from said mirror for generating a control signal in response to light received from said mirror, an array of plural directive light sources for disposition on said vehicle for collectively generating an illuminating beam in said ahead direction when energized, rotatable switching means, said last named means having mounting means for rotation in relation with said mirror, connecting means for selectively energizing the light sources of said array in response to the rotary positioning of said rotatable switch means and to the cooperative occurrence of said control signal.

2. Apparatus as set forth in claim 1 wherein said connecting means comprises means responsive to the diablement of one of the directive light sources of said plural array for maintaining successively positioned ones of said directive array in deenergized condition pending full rotation of said switching means.

3. Apparatus for mounting on a movable vehicle for casting illumination in an ahead direction corresponding to the direction of motion of said vehicle which comprises a source of illuminating light, a first, reflective polygonal prism, mounting means for said prism for rotating said prism about an axis perpendicular to said ahead direction, whereby light from a source in said ahead direction is received by and reflected from said first prism in the course of rotation thereof, directive control means for light from said source, of illuminating light, said last named means comprising a second reflective polygonal prism, means mounting said second prism for rotation in fixed spatial relation with said first prism, control means responsive to the incidence of light on said first prism for controlling energizing of said source of illuminating light, said second prism being oriented with respect to said last named source for directing illumination angularly therefrom in accordance with the angular positioning of said reflective prisms, means linking said first and second polygonal prisms in fixed spatial relation.

4. Apparatus for mounting on a movable vehicle which comprises directive illuminating means for casting illumination generaly in an ahead direction with respect to the direction of motion of said vehicle, a shaft for mounting said illuminating means for rotation about an axis perpendicular to the direction of motion of said vehicle, drive means for rotating said shaft about said axis, means for generating a control signal in response to light incident thereon, platform means for mounting said illuminating means and at least a portion of said signal generating means, means for driving said platform means in rotation about an axis perpendicular to said ahead direction, electric means responsive to said control signal for regulating the rotation of said illuminating means mounting platform means in response to illumination of said control signal generating element, whereby, upon activation of said signal generating means, said illuminating means and said control element rotate in fixed spatial relation.

5. Apparatus as defined in claim 4 wherein, said signal generating means comprises a rotatable, polygonal mirror the sides of which are generally parallel to said perpendicular axis.

6. Illuminating apparatus having a fixed source of illumination responsive to the direction of counter light incident thereon and inhibiting illumination of the origin of the counter light comprising: a continuously rotatable polygonal reflector positioned for scanning the position of said origin and receiving said counter light, a phototransducer optically coupled to said reflector and intermittently energized by light reflected therefrom during the receipt of said counter light, and electrically regulated means coupled to said phototransducer and selectively enabled thereby to control the driection of the projection of said illumination during and subsequent the receipt of said counter light.

7. Apparatus as set forth in claim 6 wherein said illumination source comprises an array of plural directive light sources, the plural sources of said array being disposed for cooperatively generating an illuminating beam in said ahead direction.

8. Apparatus as defined in claim 7 wherein, said electrically regulated means comprises an array of switching elements respectively coupled to said array of light sources and energized by said phototransducer, and means sequentially enabling said switching elements.

9. Apparatus as defined in claim 6 wherein, the sides of said polygonal reflector are parallel to its axis of rotation.

10. Apparatus as defined in claim 6 wherein, at least one of the sides of the polygonal reflector is inclined from its axis of rotation.

11. Apparatus as defined in claim 6 wherein, said electrically regulated means comprises bistable switching means coupled to said source of illumination and controlling the timing of its operation by shifting to one of its stable states when enabled by said phototransducer.

12. Apparatus as defined in claim 11 wherein, said electrically regulated means further comprises cyclic switching means linked to said polygonal reflector and electrically coupled to said bistable switching means for shifting it to its other stable state and thereby enabling the operation of said source.

13. Apparatus as defined in claim 6 further comprising: a second polygonal reflector rotatively linked to said first polygonal reflector and positioned to reflect light from said source of illumination.

14. Apparatus as defined in claim 6 wherein, said electrically regulated means comprises motor driven differential drive means having an output which is selectively reversible in response to control by said phototransducer.

15. Apparatus as defined in claim 14 wherein, said electically regulated means further comprises an opaque screen pivotally mounted for directional interposition between said source of illumination and said origin of counter light, said screen being driven by said output.

16. Apparatus as defined in claim 14 wherein, said electrically regulated means further comprises a continuously rotated segmented conductor and a pair of variably positioned contacts, the distance between said contacts determining the duration that said output is driven continuously in a first direction.

17. Apparatus as defined by claim 6 wherein, said electrically regulated means further comprises a continuously rotatable platform linked to said polygonal reflector, and a plurality of opaque members carried on said platform and spaced in accordance with the number of sides of said reflector and the relative rates of rotation of said platform and reflector to prevent illumination from said source from being incident upon said phototransducer.

References Cited by the Examiner

UNITED STATES PATENTS

| 2,490,948 | 12/1949 | Coulter | 315—83 X |
| 2,734,149 | 2/1956 | Rabinow | 315—83 |
| 2,753,487 | 6/1956 | Bone | 315—82 |
| 2,934,676 | 4/1960 | Miller et al. | 315—83 |

JAMES W. LAWRENCE, *Primary Examiner.*

C. R. CAMPBELL, *Assistant Examiner.*